United States Patent [19]
Kikuchi

[11] 3,745,575
[45] July 10, 1973

[54] METHOD OF DETECTING SUBSURFACE OBJECTS

[75] Inventor: Hideyuki Kikuchi, Musashino, Japan

[73] Assignee: Kikuchi Natural and Applied Science Research Laboratory, Minami-Saku-gun, Nagano-ken, Japan

[22] Filed: Feb. 1, 1972

[21] Appl. No.: 222,631

[30] Foreign Application Priority Data
Feb. 9, 1971 Japan.................................. 46/5401

[52] U.S. Cl. ..................... 343/12 R, 343/5 R, 324/6
[51] Int. Cl. ........................... G01s 9/02, G01v 3/12
[58] Field of Search ......................... 343/5 R, 17 R; 324/6

[56] References Cited
UNITED STATES PATENTS
3,351,936   11/1967   Feder.................................. 343/5 R
3,665,466   5/1972   Hibbard............................. 343/5 R Primary Examiner—T. H. Tubbesing
Attorney—S. Delvalle Goldsmith, Lester Horwitz et al.

[57] ABSTRACT

A method of detecting subsurface objects such as ore deposits by producing a graded transition layer for the propagation of electromagnetic waves having, for example, an exponential or square law characteristic at the air-water or air-earth interface by directing an electromagnetic wave from a stereo antenna through a non-linear element having, for example, an exponential or square law characteristic and a half-wavelength space transformer and, when desired, by simultaneously directing another electromagnetic wave from a linear antenna to the interface to enable the electromagnetic waves to pass through the interface to penetrate into the water or earth and to be reflected by the subsurface objects into the air.

7 Claims, 17 Drawing Figures

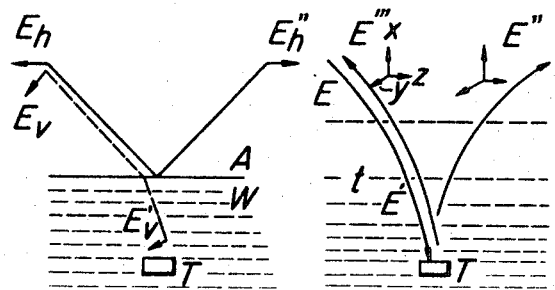
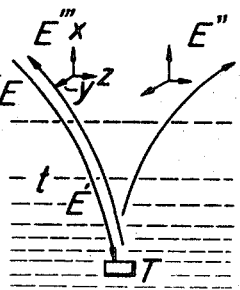
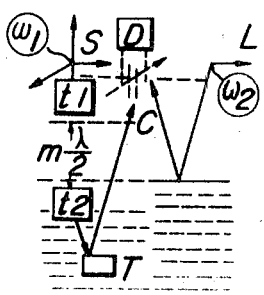
FIG. 1a    FIG. 1b    FIG. 1c
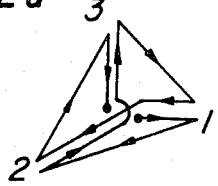
FIG. 2a
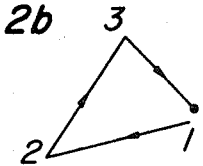
FIG. 2b
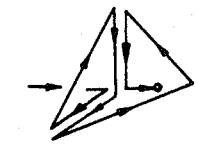
FIG. 2c
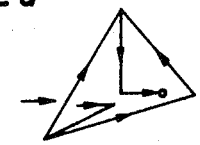
FIG. 2d
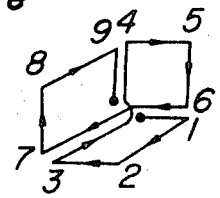
FIG. 2e
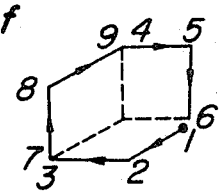
FIG. 2f
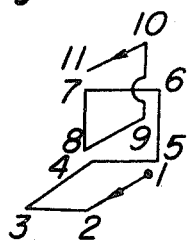
FIG. 2g

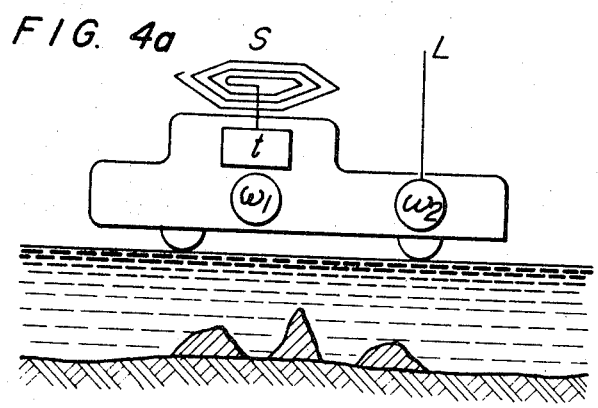
FIG. 4a
FIG. 4b
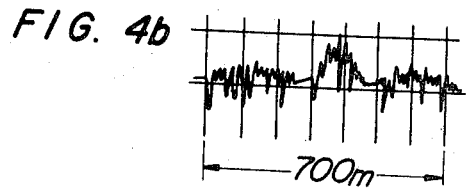
700m
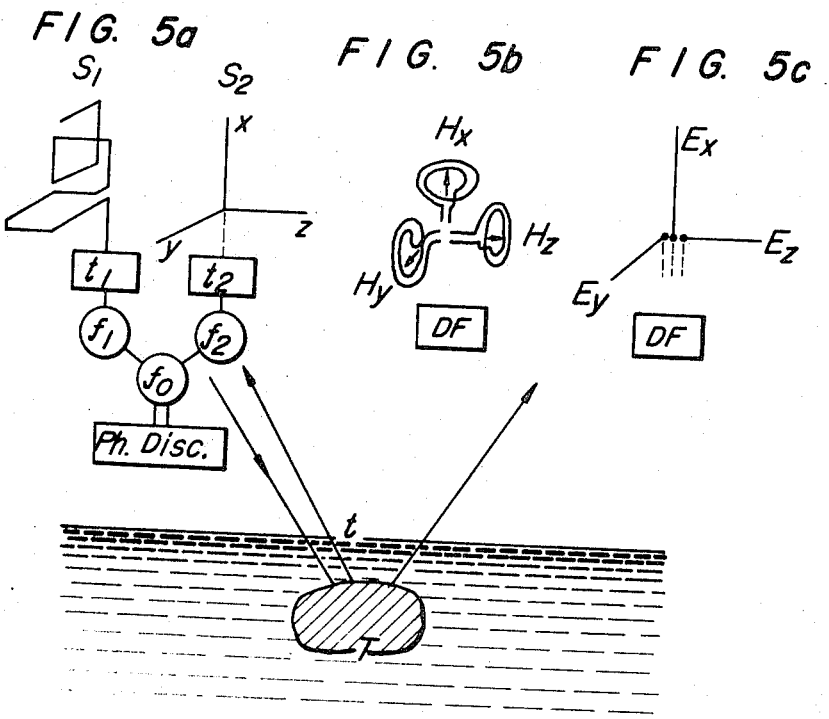
FIG. 5a  FIG. 5b  FIG. 5c

METHOD OF DETECTING SUBSURFACE OBJECTS

The present invention relates to a method of detecting subsurface bodies or objects such as ore deposits below the surface of the water or earth, and more particularly to a method of detecting subsurface bodies by means of electromagnetic waves by enabling the electromagnetic waves to penetrate into the water or earth.

Assume that there is a huge subsurface body having a large normalized wave impedance $$\zeta = \sqrt{\frac{j\omega\mu}{\sigma + j\omega G}} \Big/ \sqrt{\frac{j\omega\mu_0}{\sigma_0 + j\mu G_0}}$$

such as an iron or ferrite deposit having a large magnetic permeability $\mu$, or having a small normalized wave impedance such as a conductor having a very large electric conductivity $\sigma$ or a ferroelectric having a very large specific inductive capacity $\epsilon$.

However, even if such a subsurface body is desired to be detected, it has generally been impossible to detect any subsurface body from a site in the air or on the ground by means of ordinary electromagnetic waves because they are overly reflected at the air-earth or air-water interface, or, alternatively, they overly pass through the interface and are never reflected back into the air.

Therefore, it is an object of the present invention to provide a method of detecting subsurface objects by means of electromagnetic waves.

Briefly, the present invention is characterized by producing a graded transition layer for the propagation of electromagnetic waves at the air-water or air-earth interface by directing an electromagnetic wave through a non-linear element and a half-wavelength space transformer and, when desired, by directing another electromagnetic wave to the interface to enable the electromagnetic waves to pass through the air-water or air-earth interface to penetrate into the water or earth.

The present invention will be described in more detail with reference to the accompanying drawings, in which:

FIGS. 1a and 1b are wave propagation paths when a transition layer exists or not, respectively;

FIG. 1c is a schematic diagram for explaining the generation of a transition layer;

FIGS. 2a to 2g are different types of antennas used in the present invention;

Figure 3A:
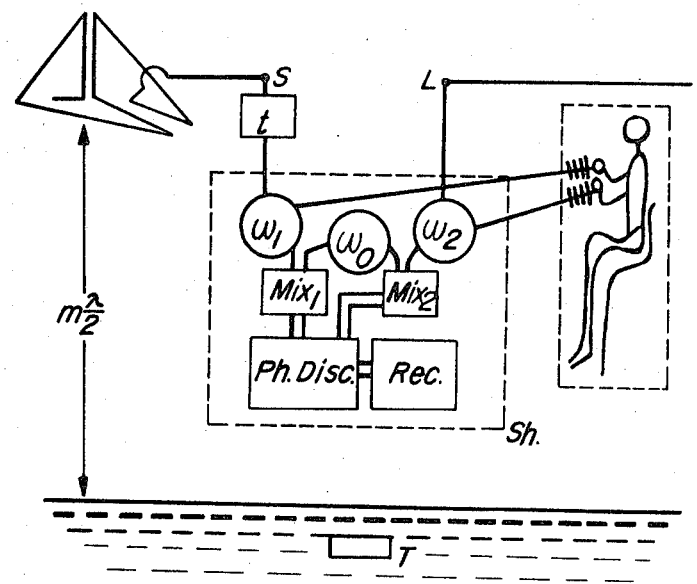
FIG. 3a is an experimental arrangement for embodying the method according to the present invention.

FIG. 4 is a practical form embodying the present invention in which a is a car equipped with a detecting system and b is an example of an actually detected waveform; and FIG. 5a–5c are schematic diagrams for explaining a receiving check system of three directional components of electric and magnetic fields of two intermittent or pulse modulated waves radiated by oscillators and reflected by a target body.

Now, when a plane electromagnetic wave or TEM wave propagates through the air-water interface, impinges upon a conductor in the water, and reflects therefrom, the composite normalized impedance of the wave is expressed as $\zeta = \tanh(\gamma l + \gamma' l')$, where $\gamma$ is the propagation constant in the air, $l$ is the length of the wave path in the air, and $\gamma'$ and $l'$ are those in the water.

In such a case, the visibility $v$ of an object at a distance $l'$ downwards from the air-water interface from a location at a distance $l$ upwards from the air-water interface is expressed by $v = \text{sech } 2(\gamma l + \gamma' l')$, from which it can be seen that the visibility $v$, i.e., detection sensitivity, rapidly decreases as the depth $l'$ of the object increases.

However, if such a discontinuous or abrupt air-water interface is replaced by a graded transition layer having an exponential characteristic of $$\sigma' + j\omega\epsilon' = (\sigma_o + j\omega\epsilon_o)e^{4(\gamma l + \gamma' l')},$$

the wave impedance is $$\zeta = \zeta_o e^{-2(\gamma l + \gamma' l')}$$

Then, the visibility $v$ becomes $$v = \tanh 2(\gamma l + \gamma' l')$$

Referring now to FIG. 1a, a horizontally polarized TEM wave $E_h$ (solid line) incident upon the water W is substantially totally reflected by the surface of the water W to become a reflected wave $E_h''$, while a vertically polarized TEM wave $E_v$ (dotted line) incident upon the water W at a Brewster angle passes through the air-water interface and penetrates into the water W to become a refracted wave $E_v'$ which is never backscattered into the air A. Consequently, the visibility $v$ of a target body T in the water W from the air A is zero.

However, when a graded transition layer $t$ for the propagation of electromagnetic waves exists at the air-water interface as shown in FIG. 1b, the wave E smoothly penetrates into the water as indicated by E' and reflected or backscattered as indicated by E''' or forwardscattered as indicated by E'' by the target T into the air. At this time the visibility $v$ is expressed as $\tanh 2(\gamma l + \gamma' l')$ from which it can be seen that the visibility $v$ increases with the depth $l'$ of the target T from the surface of the water. Consequently, if there exists a magnetic body having a permeability of $\mu = \mu_o e^{4(\gamma l + \gamma' l')}$ or body having a very large value of $\sigma + j\omega\epsilon$ (a conductor having an infinite conductivity $\sigma$ or a dielectric having an infinite $\epsilon$) in the transition layer, the normalized wave impedance $\zeta$ becomes $\zeta_o$ or 0, respectively, to cause a strong reflection. Thus, a considerable detective visibility can be provided.

A method of producing such a graded transition layer is as follows.

If a graded transition layer is there at the air-water interface, an electromagnetic wave, when directed to the air-water interface, is reflected after it has penetrated into the transition layer to a certain extent. Consequently, there exists a component of a spatially ellipsoidally polarized wave in the reflected wave. Conversely, if an electromagnetic wave containing a spatially ellipsoidally polarized wave is directed to the air-water interface, a graded transition layer is induced thereat.

An arrangement for inducing such a graded transition layer $t_2$ is shown in FIG. 1c. An electromagnetic wave having an angular frequency $\omega_1$ emitted by a stereo antenna S is directed to the air-water interface through a non-linear element $t_1$ and a half-wavelength space transformer $m\lambda/2$ to which electromagnetic wave is coupled another electromagnetic wave having an angular frequency of $\omega_2$ emitted by a linear antenna L through a parametric coupling element C to greatly improve the visibility D of a subsurface target T.

An antenna used for this purpose and connected to a transmitter, receiver, or transmitter-receiver may be any one of those shown in FIG. 2a to 2g, in which those shown in FIGS. 2a to 2d are triangular or tetrahedral antennas suitable for being mounted on an aircraft at its tail, and those shown in FIGS. 2e to 2g are hexahedral antennas. All of them radiate an electromagnetic wave in the free space in x-, y- and z-directions which has three electric components $E_x$, $E_y$ and $E_z$ and three magnetic components $H_x$, $H_y$ and $H_z$, thus six components in total. Consequently, when the electromagnetic wave is directed to the air-water interface, six electric and magnetic fields are induced at the interface correspondingly to the six components of field of the incident electromagnetic wave. In such a case, the z-components $E_z$ and $H_z$ can propagate a distance of only a few wavelengths in the z-direction, that is, in the direction of propagation of the electromagnetic wave.

Now consider that a stereo antenna S as shown in FIG. 2g, for example, for radiating an electromagnetic wave of a wavelength of $\iota$ is connected to the left-hand side output terminal of a transmitter and a nearly horizontal linear antenna L is connected to the right-hand side output terminal of the transmitter as shown in FIG. 3a. When the wavelength $\lambda$ is 10 cm, the total length of the antenna S is made to be $$S = N_s\lambda/2 + \lambda/4 + \Delta\lambda = 15 \text{ cm} + 2.5 \text{ cm} + 0.5 \text{ cm}$$

where $N_s$ is a positive integer or whole number including zero. 15 cm, 2.5 cm and 0.5 cm correspond, when expressed by the voltage phase angle, to 360° + 180°, 90° and 18°, respectively. The length of the antenna L is $$L = \lambda/4 - \Delta\lambda = 2.5 \text{ cm} - 0.5 \text{ cm}$$

Thus, the antenna S is made strongly inductive so as to strongly couple with a farther subsurface conductor, and the antenna L is made strongly capacitive so as to strongly couple with a nearer subsurface body.

When a moving target passes in the neighborhood of a transmitter equipped with such a pair of antennas, the voltage phase angles of the antennas S and L at their transmitting terminals change in opposite directions to each other resulting in $$(270° + 18° \mp 3°) - (90° - 18° \pm 1°) = 216° \pm 4°,$$

concurrently therewith the equivalent lengths of the antenna S and L vary. By the use of such a system the detecting power for a small subsurface conductor can be augmented three times at the microwave region where a large molecular polarization loss exists as compared with the case where an ordinary plate TEM wave is employed, while the detection of a subsurface conductor is impossible or the visibility thereof is zero when a perfectly plane TEM wave on a bounded Lecher line, for example, is employed.

When an electromagnetic wave directed to the air-water interface is transmitted through the water and reflected by a subsurface conductor, the intensity $I$ of interference between the incident wave and the reflected wave and the visibility $v$ are $$2I = i + r^2 + 2r|c|\cos\phi r$$
$$v = 2r/i + r|c| \cos\phi r$$

where $i$ is the amplitude of the incident wave, $r$ is the amplitude of the reflected wave, $|c|$ is the self coherence, and $\phi r$ is the reradiation or reflection phase angle.

When a perfectly graded transistion layer exists at the air-water interface $$r = \tanh(\gamma l + \gamma' l')$$
$$v = \tanh 2(\gamma l + \gamma' l')$$

while when a perfectly discontinuous transition layer exists at the air-water interface $$r = [1 - \tanh(\gamma l + \gamma' l')/1 + \tanh(\gamma l + \gamma' l')]$$
$$v = \text{sech } 2(\gamma l + \gamma' l')$$

The former is the good visibility condition while the latter is the bad visibility condition. When the above-described detecting system is employed, the generation of the artificial graded transition layer is unstable due to the simmering of air, that is the transition layer appears at one time and disappears at another time depending on which good and bad visibilities of the subsurface conductor alternate.

For preventing such a simmering and to maintain a good visibility, a non-linear element having the characteristic identical with that to be given to the air-water interface is provided at the transmitter (or receiver or transmitter-receiver)-antenna circuit. However, a mere provision of such an element cannot transcribe the characteristic thereof to the air-water interface. Therefore, a half-wavelength pathlength transformer $m \lambda/2$ is inserted between the antenna and the air-water interface for the transcription. For this purpose the path length (height) $l$ between the transmitter-receiver or each of the transmitter and the receiver and the water surface and the path length (depth) $l'$ between the water surface and the subsurface conductor must be selected to be $$l = m \lambda/2, m = 0, 1, 2, \ldots$$
$$l' = n \lambda'/2, n = 0, 1, 2, \ldots$$

where $\lambda$ and $\lambda'$ are the wavelengths in the air and in the water, respectively.

When the wavelength of the microwave employed is 10 cm, the height of the transmitter above the water surface is $l_1$, the height of the receiver equipped with the non-linear detector above the water surface is $l_2$, the distance $l_{12}$ between the transmitter and the receiver is 20 cm (=2λ), and the depth $l'$ of the subsurface conductor from the water surface is $l'$, even a few millimeters displacement of the heights $l_1$ and $l_2$ from the resonance height impairs the detecting power. Thus, the pathlength selectivity of the half-wavelength transformer is very sensitive, whereas the selectivity for the depth $l'$ is low. For example, for fresh water and salt water containing 4 percent NaCl $$l_1 = 11.7 \text{ cm}, \quad 13.4 \text{ cm} = 1\lambda + \Delta\lambda,$$
$$l_2 = 2.2 \text{ cm}, \quad 2.0 \text{ cm} = 0\lambda + \Delta\lambda,$$
$$l' = 0 \text{ to } 4 \text{ cm}, \quad 0 \text{ to } 2 \text{ cm},$$

respectively.

Considering the case in which a stereo antenna S is connected with an oscillator of 3GH$_z$ (wavelength $\lambda_1$ = 10 cm), a linear antenna L is connected with an oscillator of 3.5 GH$_z$ (wavelength $\lambda_2$ = 8.57 cm), a nonlinear element is connected between the two oscillators, and the height $l$ of the two transmitting systems is determined to be $l = m \lambda/2$ ($\lambda = \sqrt{\lambda_1 \lambda_2}$), a beat wave (wavelength (wavelength $\lambda b'$ in fresh water: $\Delta \lambda b' = 14$ to 18 cm) appears in the water and is not attenuated even at a depth of 40 cm. In this case, the height is given by $l \pm \Delta l$, or, in other words, the value $l$ can be extended to a wider range than when a single wave is employed. This fact is very useful for an airborne detecting system in that even if the height $l$ of an aircraft is varied to some extent, the visibility of a subsurface conductor does not substantially vary.

Figure 3B:
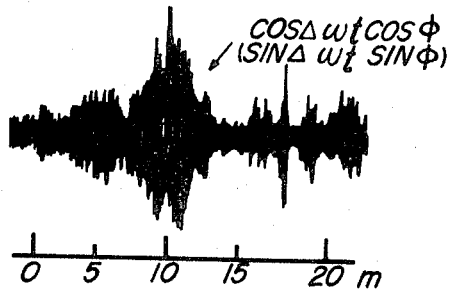
FIG. 3b is a phase discriminating waveform of a target.

FIG. 3a shows an experiment for a subsurface moving target T in a fresh water pool, and FIG. 3b shows a result of the experiment. The angular frequencies $\omega_1$ and $\omega_2$ of the waves employed were $2\pi(10.7 \text{ MHz} - 1 \text{ KHz})$ and $2\pi(10.7 \text{ MHz} + 1 \text{ KHz})$, respectively, and that $\omega_o$ of a local oscillator was $2\pi(10.7 \text{ MHz})$. A square law element having a characteristic which is nearly equal to an exponential characteristic was interposed between the stereo antenna S and the transmitter $\omega_1$. The height $l$ of the transmitters $\omega_1$ and $\omega_2$ was approximately $o\lambda$. The subsurface moving target was a horizontally disposed copper tube having a length of 1 meter. Each of the intermediate angular frequencies $\omega_o - \omega$ and $\omega_2 - \omega_o$ was about 1 KHz. The phase discrimination waveform for the horizontal movement of the target T was $\cos \Delta \omega t \cos \phi$ as shown in FIG. 3b. As the depth $l'$ of the target T increased as 0, 1, 2 and 2.8 m, the phase discrimination sensitivity, i.e., the visibility increased. This visibility coincided with the formula for good visibility when an exponentially graded transition layer existed at the air-water interface. The observer must be housed in a wire netting Sh for electromagnetic and electrostatic shielding.

A second important expedient is to employ two proximity angular frequencies $\omega_1$ and $\omega_2$ of electromagnetic waves $U = A \cos \omega_1 t$ and $V = B \cos \omega_2 t$ and the beat wave $C_{12} \cos \Delta \omega_{21} t$ thereof which can easily be transmitted through the water and reflected by the subsurface conductor back to the air where it is demodulated. For the production of the beat wave and the reflection thereof back into the air, the existence of the graded transition layer at the air-water interface is essential.

The interference intensity $I$ between the pair of waves $U$ and $V$ of different frequencies is $$2 I_{U,V} = A^2 + B^2 + 2AB|C_{12}| \cos \Delta \omega_{21} t$$

and the visibility therefor is $$v = [2(A/B)/1 + (A/B)2]|C_{12}| \cos \Delta \omega_{21} t$$

In this case, assuming that the amplitude $B$ of the V-wave is constant and there exists only a reflected wave from the water surface, the amplitude of the composite wave of the incident wave and the reflected wave is denoted by $\bar{B}$.

On the other hand, the amount $r_1$ of the U-wave reflected by the transition layer is $r_1 = \tanh(\gamma l + \gamma' l')$ and the intensity $2 I_U$ of the composite wave of the incident wave and the reflected wave is $2 I_U = 1 + r_1^2 + 2r_1 \cos \phi r_1$, where $\phi r_1$ is the reflection angle, from which the variance component $2r_1 \cos \phi r_1$ can easily be derived by means of, for example, the output transformer of a balanced type modulator as $\rho \cos \phi \cos \omega_1 t$.

Since $\bar{B} = 1 \cos(\omega_1 + \Delta \omega_{21})t$, the interference intensity $I_{U,V}$ of the two waves U and V is $$4 I_{U,V} = 2 + \rho^2(1 + \cos 2\phi) + 4\rho|C_{12}| \cos \Delta \omega t \cos \phi$$

When the beat wave determined by $\Delta \omega t$ is detected, $4\rho|C_{12}| \cos \phi$ determines the amplitude, phase and lower beat waves, and hence it can be utilized directly to detect subsurface conductors. It may be convenient to employ a phase meter having an unbalanced characteristic for $\Delta \omega t - \phi$ and $\Delta \omega t + \phi$ for the detection.

If the antennas S and L are arranged in such a manner that they have no parallel components with each other as shown in FIG. 4a, the waves U and V do not couple with each other, resulting in zero intensity of interference $U^2 + V^2$ and a phase angle of $$\psi \text{ incoh} = \Delta \omega t - \tan^{-1}(\pm \eta)$$

where $\eta = (A^2 - B^2)/(A^2 + B^2)$

On the other hand, by the mixing action of the exponential or square low element disposed between the transmitters (or receivers) or between the transmitters and the antennas and in the transition layer the phase angle of the squared wave $(U + V)^2$ is $$\psi \text{ coh} = [(\Delta \omega t/2) - \tan^{-1} \xi \tan \Delta \omega t/2]$$

where $$\xi = [(A^2 - B^2 - (2AB + 2B^2 \cos \Delta \omega t)/A^2 - B^2 + (2AB + 2B^2 \cos \Delta \omega t)]$$

The time rate of the phase variation $\psi$ incoh is twice that of $\psi$ coh irrespective of the amplitude ratio $A/B$, the hence the intensity wave $(U^2 + V^2)$ may parametrically pump the interfered intensity wave $(U + V)^2$, thus amplifying the detectability of the subsurface conductor.

FIG. 4b shows an interference pattern of the U- and V-waves when a motor car on which U- and V-oscillators are mounted runs at a 30 km/hour on the ground under which black ore deposits or others are supposed to exist at depths of from 250 to 450 meters. The angular frequencies $\omega_1$, $\omega_2$ and $\omega_o$ of the U- and V-waves and local oscillator employed were $2\pi(4300 - 1 \text{ KHz})$, $2\pi(4,300 + 1 \text{ KHz})$ and $2\pi(4,300 \text{ KHz})$, respectively. From the phase difference between the A-wave and the B- or $\bar{B}$-wave, the phase of the B- or $\bar{B}$-wave being taken as a standard, the depth of the subsurface target can be determined.

FIG. 5a shows another arrangement in which two waves $U(f_1)$ and $V(f_2)$ of different frequencies are coupled with two different types of stereo antennas $S_1$ and $S_2$, respectively. The waves $U(f_1)$ and $V(f_2)$ are emitted from the rader system for only a short pulse duration. Receivers receive only backscattered waves and a phase discriminator detects the phase difference between the two waves. The waves reflected by a subsurface target T are represented as $\rho_1 = r_1 e^{j\phi r_1}$ and $\rho_2 = r_2 e^{j\phi r_2}$, where $\phi r_1$ and $\phi r_2$ are the phases of the reflected waves. The interference intensity $I_{U',V'}$ of the two pulsed waves U and V can be obtained by receiving only the reflected magnetic field composed of three components $H_x$, $H_y$ and $H_z$ as shown in FIG. 5b by means of the one receiver and by receiving only the reflected electric field composed of three components $E_x$, $E_y$ and $E_z$ as shown in FIG. 5c by means of the other receiver and combining them. When $r_1 = r_2$, the intensity of the received signal at the phase discriminator is $$2 I_{U',V'} = (\rho_1 \cos \omega_1 t + \rho_2 \cos \omega_2 t)^2$$

$$= \rho_1^2 + \rho_2^2 + 2\rho_1 \rho_2 |C_{12}| \cos \Delta \omega_{21} t$$

and the visibility $v$ is $$V = \frac{2(\rho_1/\rho_2)}{1 + (\rho_1/\rho_2)^2} |C_{12}| \cos \Delta\omega t$$

$$= (|C_{12}| \cos \Delta\omega t \cos \Delta\phi) \cdot \sec^2 \Delta\phi$$

where $\Delta\phi = \phi r_1 - \phi r_2$. Thus, the visibility $v$ is amplified by a factor of $\sec^2 \Delta\phi$ as compared with the previous case where the U-wave is a spatially polarized wave and the V-wave is a plane wave.

In this case also, two non-interfered and independent intensity waves $(U')^2 + (V')^2$ are produced besides the interfered wave $(U' + V')^2$. The two intensity waves effect parametric pumping of the detection sensitivity by the interfered wave to contribute to the amplification of the detection sensitivity. As is seen from the theory of parametric amplifier, the angular frequency of the composite wave of the U- and V-waves deviates from $(\omega_1 + \omega_2)/2$ to $\omega$, and the beat angular frequency $(\omega_2 - \omega_1)$ deviates from $\Delta\omega_{21}$ to $\Delta\omega$. By this method the detection sensitivity is greatly increased by the effect of the above $\sec^2 \Delta\phi$ and by the effect of transient phenomena in oscillation and transmission.

When a measurement of three directional components of reflected electric and magnetic waves does not prove the existence of an expected reflected ellipsoidally polarized wave which indicates the production of a graded transition layer at the air-water or air-earth interface, the detecting method according to the present invention is not effective. Accordingly, such a measurement of three directional components is essential as a criterion on whether the method according to the present invention is effective or not.

The radar receiving apparatus of FIG. 5a which can measure the distance to a subsurface ore deposit is mounted on the ground or on an aircraft. The direction of the ore deposit can be determined by a direction finder DF from the direction of the reflected wave.

Transformation of the interference visibility representation $\cos \Delta\omega t \cos \phi$ of the subsurface conductor as shown in FIG. 3b into $\sin \Delta\omega t \sin \phi$ and the visibility representation $\cos \Delta\omega t/\cos \Delta\phi$ provided by the interference of the two reflected waves as shown in FIG. 5a into $\sin \Delta\omega t/\sin \Delta\phi$ by artificially shifting the phase difference by 90° or by differentiation is effective to improve the signal to noise ratio or the contrast of the target to the background when $\Delta\omega t$ or $\phi$ and $\Delta\phi$ are small.

When the variation in $\phi$ and $\Delta\phi$ exceeds 360°, it may sometimes be convenient to represent the phase difference as a lower beat. In such a case, a sensitive lower beat frequency meter may sometimes be employed in place of the phase discriminator for the detection of a subsurface ore body. That is, $$\sin \Delta\omega t \cdot (\sin \Delta\phi) \rightarrow \sin \Delta\omega t \cdot (\sin \Delta\Delta\omega t \cdot \sin \Delta\Delta\Delta\omega t \ldots)$$

and $$\sin \Delta\omega t/(\sin \Delta\phi) \rightarrow \sin \Delta\omega t/(\sin \Delta\Delta\Delta\omega t \cdot \sin \Delta\Delta\Delta\omega t \ldots)$$

The lower beat frequencies detecting method often provides a high detectability of a subsurface ore body located at about several tens of kilometers below the surface which corresponds to $\Delta\Delta\Delta\omega t$ of the beat of beats.

Compared with the well-known airborne magnetic detecting method, the detecting method according to the present invention is advantageous in that a. The system embodying the present invention can be mounted on an air craft, a running car, or a walking human's or animal's back.

b. By employing a pair of low frequency radio waves, effects of mountains, rivers and earth magnetism can be avoided.

c. Both long range and short range detections can be effected by adjusting the frequencies of emanating radio waves and beat waves or by adjusting the set point of a phase meter, and both macroscopic coarse and local fine detections can be effected by adjusting the sensitivity of the detecting system.

d. Mineral samples can easily be picked up immediately after the detection because the location of the ore deposit can be effected on the ground.

What is claimed is

1. A method of detecting subsurface objects in which a first electromagnetic wave having a first angular frequency is directed through a non-linear element and a half-wavelength space transformer to the air-water or air-earth interface, whereby a graded transition layer for the propagation of said electromagnetic wave is produced at said interface to enable said electromagnetic wave to pass through said interface to penetrate into the water or earth to be reflected or backscattered or forwardscattered by subsurface objects into the air.

2. A method of detecting subsurface objects according to claim 1, in which said non-linear element and said transition layer have exponential or square law characteristics.

3. A method of detecting subsurface objects according to claim 1, in which a second electromagnetic wave having a second angular frequency which is different from said first frequency is directed to said interface simultaneously with said first electromagnetic wave.

4. A method of detecting subsurface objects according to claim 3, in which said first electromagnetic wave is emitted from a stereo antenna and said second electromagnetic wave is emitted from a linear antenna, whereby the coherent component of said second electromagnetic wave interferes with said first electromagnetic wave and the incoherent component of said second electromagnetic wave effects parametric jumping of said first electromagnetic wave.

5. A method of detecting subsurface objects according to claim 3, in which both of said first and second electromagnetic waves are emitted from respective stereo antennas, and said first and second electromagnetic waves form a beat wave which is detected in said transition layer and reflection modulated when it is reflected by said subsurface objects.

6. A method of detecting subsurface objects according to claim 3, in which said electromagnetic waves are in the intermittent or pulse form so that the reflected waves can be separated, and said reflected two waves are subjected to phase comparison to effect range determination.

7. A method of detecting subsurface objects according to claim 6, in which said reflected waves are separately received by separate receivers to monitor the generation of said transition layer.

* * * * *

UNITED STATES PATENT OFFICE
CERTIFICATE OF CORRECTION

Patent No. 3,745,575     Dated July 10, 1973

Inventor(s) Hideyuki Kikuchi

It is certified that error appears in the above-identified patent and that said Letters Patent are hereby corrected as shown below:

Column 3, line 23, "of $\mathcal{L}$ is" should read -- of $\lambda$ is --.

Column 6, line 11, after "$(\pm\eta)$" insert -- $\tan\Delta\omega t$ --; line 47, "rader" should read -- radar --. Column 8, line 44, "jumping" should read -- pumping --.

Signed and sealed this 31st day of December 1974.

(SEAL)
Attest:

McCOY M. GIBSON JR.
Attesting Officer

C. MARSHALL DANN
Commissioner of Patents